United States Patent
Reichert et al.

(10) Patent No.: US 12,348,091 B2
(45) Date of Patent: Jul. 1, 2025

(54) METHOD FOR PRODUCING A STACK OF METAL SHEETS FOR AN ELECTRIC MOTOR

(71) Applicant: ElringKlinger AG, Dettingen (DE)

(72) Inventors: Magnus Reichert, Reutlingen (DE); Michael Schaich, Metzingen (DE); Florian Haßler, Eningen u.A. (DE); Fabienne Anhorn, Reutlingen (DE); Wojtek Kolasinski, Reutlingen (DE); Peter Braun, Nürtingen (DE)

(73) Assignee: ElringKlinger AG, Dettingen (DE)

( * ) Notice: Subject to any disclaimer, the term of this patent is extended or adjusted under 35 U.S.C. 154(b) by 701 days.

(21) Appl. No.: 17/685,872

(22) Filed: Mar. 3, 2022

(65) Prior Publication Data

US 2022/0271635 A1   Aug. 25, 2022

Related U.S. Application Data

(63) Continuation of application No. PCT/EP2020/075155, filed on Sep. 9, 2020.

(30) Foreign Application Priority Data

Sep. 9, 2019   (DE) ..................... 10 2019 213 659.1

(51) Int. Cl.
*H02K 15/12*   (2025.01)
*H01F 3/02*   (2006.01)
(Continued)

(52) U.S. Cl.
CPC ............... *H02K 15/12* (2013.01); *H01F 3/02* (2013.01); *H02K 1/04* (2013.01); *H02K 9/19* (2013.01); *H02K 15/02* (2013.01)

(58) Field of Classification Search
CPC ............ H02K 15/12; H02K 1/04; H02K 9/19; H02K 15/02; H01F 3/02; H01F 41/0233;
(Continued)

(56) References Cited

U.S. PATENT DOCUMENTS 3,558,396 A * 1/1971 Denyssen ........... H01F 41/0233
                                                              336/219
4,103,195 A * 7/1978 Torossian ................. H02K 1/04
                                                              310/216.065

(Continued)

FOREIGN PATENT DOCUMENTS

| JP | 2005191033 A | 7/2005 |
|---|---|---|
| JP | 2014096429 A | 5/2014 |

*Primary Examiner* — Donghai D Nguyen
(74) *Attorney, Agent, or Firm* — ASLAN LAW, P.C.

(57) ABSTRACT

To provide a method by means of which stacks of metal sheets can be produced in an easy and efficient way, it is proposed that the method comprises the following: coating one or more metal sheets with a bonding substance; bonding multiple metal sheets to form a sheet-metal laminate by a first activation of the bonding substance; cutting up the sheet-metal laminate to produce multiple sheet-metal laminate units and/or cutting out multiple sheet-metal laminate units from the sheet-metal laminate; and bonding the multiple sheet-metal laminate units to form a stack of metal sheets by a second activation of the bonding substance, wherein the bonding substance comprises a resin material and an elastomer material.

14 Claims, 5 Drawing Sheets

(51) Int. Cl.
*H02K 1/04* (2006.01)
*H02K 9/19* (2006.01)
*H02K 15/02* (2006.01)

(58) Field of Classification Search
CPC .............. B32B 15/043; B32B 2255/26; B32B 2457/00; B32B 7/12; B32B 15/18; Y10T 29/49009
See application file for complete search history.

(56) References Cited

U.S. PATENT DOCUMENTS

| | | | |
|---|---|---|---|
| 7,960,890 B2* | 6/2011 | Miyake | H02K 15/022 310/43 |
| 2006/0132278 A1 | 6/2006 | Reyal et al. | |
| 2009/0072086 A1 | 3/2009 | Smith et al. | |

* cited by examiner

METHOD FOR PRODUCING A STACK OF METAL SHEETS FOR AN ELECTRIC MOTOR

RELATED APPLICATION

This application is a continuation of international application No. PCT/EP2020/075155 filed on Sep. 9, 2020, and claims the benefit of German application No. 10 2019 213 659.1 filed on Sep. 9, 2019, which are incorporated herein by reference in their entirety and for all purposes.

FIELD OF DISCLOSURE

The present invention relates to a method for producing a stack of metal sheets, in particular a laminated electrical steel core.

The invention also relates to a stack of metal sheets, in particular a rotor core and/or a stator core.

The invention further relates to a machine component, in particular a rotor and/or a stator and an electric motor.

BACKGROUND

Methods for producing a stack of metal sheets are known from WO 2014/089593 A1, WO 2012/059588 A1 and WO 2016/033630 A1.

SUMMARY OF THE INVENTION

The object of the present invention is to provide a method by means of which stacks of metals sheets can be produced in an easy and efficient way.

This object is achieved by a method according to claim 1.

The method is preferably a method for producing multiple stacks of metal sheets, which in particular also includes method steps which take place after the actual production up to delivery.

The one or more stacks of metal sheets are preferably laminated electrical steel cores.

The method preferably comprises the following:

coating one or more metal sheets with a bonding substance;

bonding multiple metal sheets to form a sheet-metal laminate by a first activation of the bonding substance;

cutting up the sheet-metal laminate to produce multiple sheet-metal laminate units and/or cutting out multiple sheet-metal laminate units from the sheet-metal laminate;

bonding the multiple sheet-metal laminate units to form a stack of metal sheets by a second activation of the bonding substance.

It can be advantageous if one or more parameters differ during the first activation and the second activation.

Due to the fact that the one or more parameters differ during the first and the second activation, the bonding of the multiple metal sheets to form a sheet-metal laminate and the bonding of the multiple sheet-metal laminate units can preferably be carried out separately from one another in terms of time.

For this purpose, the bonding substance preferably has properties which allow a two-stage activation.

In particular, a multi-stage, for example two-stage activation of the bonding substance is possible.

A "parameter" is preferably understood to mean a temperature or a pressure.

In addition to a pressure-dependent and/or temperature-dependent activation of the bonding substance, the first activation and/or the second activation can be carried out by setting certain further reaction conditions, for example different pH values.

The bonding of the multiple metal sheets by the first activation of the bonding substance is preferably an integral bond.

The bonding of the multiple sheet-metal laminate units by the second activation of the bonding substance is in particular an integral bond.

It can be favorable if the bonding substance is an adhesive.

It can be the case that one metal sheet is coated on both sides with the bonding substance and then in each case a further metal sheet is brought into contact with the coatings on both sides of the coated metal sheet. The three metal sheets are then preferably bonded together, in particular integrally, by the first activation of the bonding substance.

However, it is preferable for all the metal sheets to be coated on both sides.

It has proven to be particularly efficient in the method to coat exactly three metal sheets on both sides with the bonding substance and then to bond them together.

The stack of metal sheets is a laminated core, for example.

The metal sheets are e.g. electrical steel sheets, in particular comprising an iron-silicon alloy. It can be favorable if the metal sheets are produced by cold rolling.

The one or more metal sheets are preferably coated with the bonding substance over the entire surface. In this case, a thickness of the bonding substance after coating is preferably at least approximately constant perpendicularly to a main extension plane of the relevant metal sheet.

The coating of the one or more metal sheets with the bonding substance is preferably carried out without bubbles and/or without degassing.

For an optimized process flow, it can be favorable if the first activation and the second activation are carried out one after the other.

The method is preferably a continuous method and/or suitable for the series production of stacks of metal sheets.

It can be advantageous if the bonding of the multiple metal sheets to form a sheet-metal laminate is carried out "in-line." "In-line" means preferably in a continuous process.

The method is preferably part of a flow production in which in particular a locally progressive, temporally determined, uninterrupted sequence of work steps is implemented.

It can be favorable if the first activation is a thermal activation. Additionally or alternatively, the second activation is a thermal activation.

In embodiments in which both the first activation and the second activation are thermal activations, the bonding substance is preferably selected such that it reacts in two different temperature ranges. A chemical and/or physical crosslinking and/or integral bonding reaction preferably takes place in two different temperature ranges.

It can be advantageous if a first temperature to which the bonding substance is heated during the first activation, and a second temperature to which the bonding substance is heated during the second activation, differ by approximately 30° C. or more, in particular approximately 40° C. or more, for example by approximately 50° C. or more.

The first temperature and the second temperature preferably differ by 80° C. or less, in particular approximately 70° C. or less, for example approximately 60° C. or less.

A ratio of the second temperature during the second activation and the first temperature during the first activation is preferably 1.5:1 or more, in particular approximately 2.5:1 or more, for example approximately 3:1 or more.

A ratio of the second temperature during the second activation and the first temperature during the first activation is preferably 4.5:1 or less, in particular approximately 4:1 or less, for example approximately 3.5:1 or less.

As an alternative to said embodiment in which both the first activation and the second activation are thermal activations, it can be favorable if the first activation is a thermal activation and the second activation is an activation by pressure or vice versa.

According to a further alternative, both the first activation and the second activation are activations by pressure.

In the case of activation by pressure, the elements to be bonded are preferably pressed against one another in a bonding direction. The bonding direction is preferably substantially perpendicular to a main extension plane of the metal sheets or the sheet-metal laminate units.

Additionally or alternatively, a reaction chamber in which the relevant activation is carried out can be subjected to an overpressure or a negative pressure, and activation by pressure is thus carried out.

Additionally or alternatively, the first activation and/or the second activation can be a chemical activation.

In the case of a chemical activation, a reaction initiator, for example a radical initiator and/or a crosslinking agent, is preferably added to the bonding substance at the time of activation. For example, a gas is introduced into the reaction chamber.

It can be advantageous if the multiple bonded metal sheets are wound up. In particular, the one or more metal sheets are unwound for coating with the bonding substance.

For example, the metal sheets are wound up into a coil.

It can be advantageous if the sheet-metal laminate resulting from the bonding of the metal sheets is wound up before it is treated in the further course of the method. In the case of further processing of the sheet-metal laminate, this is in particular unwound.

To produce the sheet-metal laminate, the multiple metal sheets are preferably brought into contact with one another and/or pressed together on their aligned flat sides after the coating.

The metal sheets arranged one above the other can be pressed together in a pressing tool, for example a press. The pressing together preferably takes place substantially perpendicularly to a main extension plane of the metal sheets.

The metal sheets coated with the bonding substance can also be pressed together and/or compressed by rollers, via which the metal sheets arranged one above the other and coated with the bonding substance are guided.

In embodiments in which the multiple metal sheets are electrical steel sheets, multiple metal sheets can be arranged in different orientations with respect to a pressing direction before the metal sheets are in particular integrally bonded. Thus, due to a material anisotropy of the electrical steel sheets, an increased efficiency as a stator core and/or rotor core of the stack of metal sheets can be formed.

Electrical steel sheets that follow one another in the stacking direction are preferably stacked one on top of the other so as to be rotated by approximately 30° to approximately 120° with respect to a main grain orientation direction.

In this way, an increase in efficiency can be achieved with the same or reduced costs in a resulting laminated electrical steel core which is used in a stator and/or rotor.

For example, two metal sheets are arranged transversely and two metal sheets are arranged longitudinally in a pressing tool, for example in a press.

Alternatively or in addition, multiple sheet-metal laminate units can be stacked one on top of the other before the bonding by the second activation of the bonding substance in such a way that main grain orientation directions are arranged so as to be offset with respect to one another in a stacking direction of metal sheets arranged one above the other in the individual sheet-metal laminate units.

The main grain orientation directions of different metal sheets in the resulting stack of metal sheets are preferably not parallel, and in particular are skewed.

The sheet-metal laminate is preferably a flat material which comprises multiple layers of metal sheets which are bonded together by the bonding substance.

The multiple metal sheets can be provided on a roll and/or wound up into a roll. A width of the roll transverse to a winding direction is preferably approximately 100 mm or more, in particular approximately 120 mm or more, for example approximately 130 mm or more.

The width of the roll is preferably approximately 200 mm or less, in particular approximately 180 mm or less, for example approximately 160 mm or less.

For example, the rolls are approximately 157.5 mm wide.

It can be the case that, before and/or after the sheet-metal laminate is cut up and/or the multiple sheet-metal laminate units are separated, multiple sheet-metal laminate units are stacked one on top of the other and/or one above the other in a stacking direction so that in particular a stack of sheet-metal laminate units is formed.

It can be favorable if the sheet-metal laminate units are produced individually and/or are separated from the sheet-metal laminate and then stacked one on top of the other before they are integrally bonded together.

Multiple sheet-metal laminates can be cut up at the same time.

The stacking direction is preferably perpendicular to a main extension plane of the sheet-metal laminate and/or a main extension plane of a metal sheet.

It can be advantageous if the multiple metal sheets are provided in a form that is pre-coated, in particular on both sides.

The pre-coating preferably comprises one or more of the following substances or is formed from one or more of the following substances: polyvinyl butyral, polyamide, polyester, modified polyamide, epoxy.

The pre-coating serves in particular to improve the adhesion of the bonding substance to a metal sheet surface.

A so-called "baking varnish," for example, is suitable as a pre-coating. Products under the designation "NO20" have proven to be particularly preferred.

The pre-coating is preferably already cured when the bonding substance is applied.

It can be favorable if the pre-coating is electrically insulating.

"Electrically insulating" preferably means that a material and/or component and/or element characterized in this way has an electrical conductivity of approximately $10^{-7}$ S·cm$^{-1}$ or less, in particular approximately $10^{-8}$ S·cm$^{-1}$ or less. The values are based on measurements under standard conditions.

As already mentioned, it is particularly preferred if the multiple metal sheets are each coated on both sides with the bonding substance.

The bonding substance can be mixed with a solvent before the coating, and the solvent escapes in particular directly after the coating and/or during the first activation.

It can be favorable if a ratio between a thickness of the one or more metal sheets and a layer thickness of the bonding substance is in a range of approximately 20:1 or more, in particular 25:1 or more.

The ratio between the thickness of the one or more metal sheets and the layer thickness of the bonding substance is preferably approximately 250:1 or less, in particular approximately 210:1 or less.

The layer thickness of the bonding substance after application and/or after the first activation is preferably approximately 1 μm or more, in particular approximately 4 μm or more, for example approximately 5 μm or more.

After the application and/or after the first activation, the layer thickness of the bonding substance is preferably approximately 9 μm or less, in particular approximately 8 μm or less, for example approximately 7 μm or less.

For example, the layer thickness of the bonding substance is approximately 6 μm.

The layer thickness of the bonding substance is preferably an average layer thickness perpendicularly to the main extension plane of the relevant metal sheet after coating.

The layer thickness refers in particular to the thickness of a single layer on a single side of the metal sheet in question.

The thickness of the one or more metal sheets preferably refers to the thickness of exactly one sheet.

According to a preferred embodiment, the first activation is a thermal activation in which the bonding substance is heated to a first temperature.

The first temperature during the first activation is preferably approximately 50° C. or more, in particular approximately 60° C. or more.

The first temperature during the first activation is preferably approximately 90° C. or less, in particular approximately 80° C. or less.

It can be advantageous if the bonding substance is heated by means of a heating device during the first activation.

In particular, an infrared heating device, a resistance heating device and/or an induction heating device is used as the heating device.

The first temperature and/or the second temperature is preferably the temperature which is set in a room in which the first activation or the second activation is carried out.

After the first activation, the resulting sheet-metal laminate is preferably cooled to room temperature (approximately 20° C.) and/or dried by means of a cooling device.

The cooling device is preferably part of an active cooling channel through which the sheet-metal laminate is passed.

Pre-consolidation of the multiple metal sheets is preferably carried out by the first activation.

The sheet-metal laminate is a compound metal sheet, for example.

A thickness of the metal sheets perpendicular to their main extension plane is preferably approximately 0.3 mm or less, in particular approximately 0.25 mm or less, for example approximately 0.2 mm or less.

The thickness of the metal sheets perpendicular to their main extension plane is preferably approximately 0.05 mm or more, in particular approximately 0.1 mm or more, for example approximately 0.15 mm or more.

All of the metal sheets preferably have the same thickness.

"Thickness" preferably means an average thickness.

It can be favorable if the metal sheets and/or sheet-metal laminates are flat and/or planar, in particular in parallel with and/or perpendicularly to their main extension planes.

The metal sheets and/or sheet-metal laminate units are preferably designed without projections and/or without recesses.

So-called "interlocks" are not required, for example.

It can be advantageous if a local thickness variation of the metal sheets and/or sheet-metal laminate units is approximately 5% or less, in particular approximately 2% or less, based on an average thickness of the relevant sheet and/or the relevant sheet-metal laminate unit.

The local thickness variation is preferably independent of openings and/or recesses in the metal sheets.

For a time-efficient method, it can be advantageous if the second activation of the bonding substance is carried out during the cutting up of the sheet-metal laminate to produce the multiple sheet-metal laminate units and/or the separation of the multiple sheet-metal laminate units from the sheet-metal laminate.

Additionally or alternatively, the second activation of the bonding substance is carried out in particular immediately after the sheet-metal laminate has been cut up to produce the multiple sheet-metal laminate units and/or the multiple sheet-metal laminate units have been separated from the sheet-metal laminate.

In this case, for example, sheet-metal laminate units are stacked and collected in a pressing tool and/or the second activation is carried out within the pressing tool.

It can be advantageous if the cutting up of the sheet-metal laminate to produce the multiple sheet-metal laminate units and/or the separation of the multiple sheet-metal laminate units from the sheet-metal laminate takes place by punching.

Additionally or alternatively, the sheet-metal laminate can be cut up and/or the multiple sheet-metal laminate units can be separated by electromagnetic forming.

For this purpose, a material weakening is preferably introduced into the sheet-metal laminate, for example by shear cutting and/or wedge cutting and/or embossing.

Subsequently and/or during this process, the sheet-metal laminate is preferably cut up by generating an electromagnetic pulse, for example by a pulse generator.

The cutting up of the sheet-metal laminate and/or the separation of the multiple sheet-metal laminate units is preferably carried out partially or completely by shear cutting and/or wedge cutting and/or embossing.

Regions of the sheet-metal laminate in which the cutting up and/or the separation takes place can be preheated, in particular locally, before and/or during the cutting and/or the separation. The local preheating is preferably carried out by a laser.

A fine punching tool can be integrated into a pressing tool, for example into a conventional press.

By integrating a fine punching tool into the pressing tool, it is possible in particular to form high-quality punching edges and/or to reduce costs, since in particular existing pressing tools can be used.

In particular local preheating preferably results in optimized cutting edge qualities. For example, a rollover of the cut up and/or separated sheet-metal laminate units is reduced.

Overall, it can be favorable if a low degree of punching is selected so that the resulting sheet-metal laminate units can be stacked one on top of the other with the smallest possible air gap.

Due to the lowest possible rollover, the sheet-metal lamination units form in particular the largest possible volume in the resulting stack of metal sheets.

Multiple sheet-metal laminate units and/or multiple stacks of metal sheets can be joined by forming. For example, multiple sheet-metal laminate units and/or multiple stacks of metal sheets are processed and/or clinched by press-joining.

It can be the case that, during and/or after the cutting up of the sheet-metal laminate to produce the multiple sheet-metal laminate units and/or the separation of multiple sheet-metal laminate units from the sheet-metal laminate, the sheet-metal laminate units are joined by forming.

For example, the sheet-metal laminate units and/or stacks of metal sheets are joined by press-joining, for example clinching.

One stroke of a punching tool used is preferably 275 per stack. "Stack" is to be understood, for example, as a thickness of a sheet-metal laminate and/or a height of a stack of sheet-metal laminate units and/or a thickness of the stack of metal sheets.

The thickness of the sheet-metal laminate is preferably defined perpendicularly to its main extension plane.

The height of the stack of sheet-metal laminate units is preferably defined in parallel with the stacking direction.

The thickness of the stack of metal sheets is preferably defined perpendicularly to a main extension plane of a metal sheet.

The stack of metal sheets can be stacked and/or transported for further processing in a container, for example a small load carrier.

The second activation of the bonding substance is preferably a thermal activation in which the bonding substance is heated to a second temperature.

The second temperature is preferably approximately 120° C. or more, in particular approximately 130° C. or more.

It can be favorable if the second temperature is approximately 250° C. or less, in particular approximately 180° C. or less.

The multiple sheet-metal laminate units are preferably bonded under pressure, in particular in a pressing tool, for example a press.

It can be advantageous if a punching tool for punching the sheet-metal laminate units is arranged inside the pressing tool and/or is integrated into it.

It can be favorable if the sheet-metal laminate units are pressed against one another in the stacking direction, in particular over their entire surface. This is preferably carried out within the pressing tool.

It can be the case that, in particular after multiple stacks of metal sheets have been stacked, the stack of metal sheets is marked. The marking is carried out in particular by means of a data matrix code and/or by means of laser inscription.

Additionally or alternatively, the sheet-metal laminate units are marked before they are bonded.

For a reproducible implementation of the method, it can be beneficial if quality control of the stack of metal sheets is carried out.

The object mentioned at the outset is also achieved by a method for producing a stack of metal sheets, in particular a laminated electrical steel core, the method preferably comprising the following:

coating one or more metal sheets with a bonding substance;

bonding multiple metal sheets to form a sheet-metal laminate by a first activation of the bonding substance;

cutting up the sheet-metal laminate to produce multiple sheet-metal laminate units and/or cutting out multiple sheet-metal laminate units from the sheet-metal laminate;

bonding the multiple sheet-metal laminate units to form a stack of metal sheets by a second activation of the bonding substance.

The bonding substance preferably comprises a resin material and an elastomer material.

The resin material is preferably a synthetic resin material.

Due to the different components of the bonding substance, a multi-stage activation and/or integral bonding of the metal sheets can preferably take place.

The elastomer material is preferably used for integral bonding by adhesion. In particular, the resin material is used for integral bonding by cohesion.

It can be advantageous if the elastomer material integrally bonds and/or reacts during the first activation. The resin material preferably does not integrally bond and/or react during the first activation.

It can be favorable if the resin material integrally bonds and/or reacts during the second activation. The elastomer material preferably does not integrally bond and/or react during the second activation.

Preferably, the bonding substance and/or a bonding substance/solvent mixture forms a macroscopically homogeneous mass and/or a macroscopically homogeneous liquid.

A solvent is preferably added to the bonding substance before it is applied to the one or more metal sheets.

It can be advantageous if a bonding substance/solvent mixture is applied to the one or more metal sheets.

A bonding substance/solvent mixture is preferably understood to be an in particular homogeneous mixture of the bonding substance and the solvent. In particular, the bonding substance is substantially completely dissolved and/or dispersed in the solvent.

By coating the one or more metal sheets with the bonding substance, a surface of the relevant metal sheet is preferably completely covered with the bonding substance.

It can be favorable if the bonding substance contains the elastomer material in a proportion of approximately 1 vol. % or more, in particular approximately 5 vol. % or more, based on a total volume of the bonding substance or based on a total volume of the bonding substance/solvent mixture.

The proportion of the elastomer material in the bonding substance is preferably approximately 25 vol. % or less, in particular approximately 20 vol. % or less, based on the total volume of the bonding substance or based on the total volume of the bonding substance/solvent mixture.

It can be favorable if the bonding substance contains the elastomer material in a proportion of approximately 1 wt. % or more, in particular approximately 5 wt. % or more, based on a total mass of the bonding substance or on a total mass of the bonding substance/solvent mixture.

The proportion of the elastomer material in the bonding substance is preferably approximately 25 wt. % or less, in particular approximately 20% wt. % or less, based on the total mass of the bonding substance or based on the total mass of the bonding substance/solvent mixture.

It can be favorable if the elastomer material comprises or is formed from a synthetic rubber material.

According to a preferred embodiment, the elastomer material comprises or is formed from an acrylonitrile butadiene rubber.

"Acrylonitrile butadiene rubber" is preferably synonymous with "nitrile butadiene rubber."

Acrylonitrile butadiene rubbers have the advantage that they preferably have high resistance to mineral oils, fats and/or hydrocarbons.

Additionally or alternatively to an acrylonitrile butadiene rubber, the elastomer material can comprise or be formed from a styrene butadiene rubber.

The bonding substance is preferably selected in such a way that a Shore hardness A of the bonding substance is lower after the solvent has escaped than after the second activation.

Additionally or alternatively, the Shore hardness A of the bonding substance before the first activation and/or before the solvent escapes is lower than after the second activation.

The Shore hardness is preferably determined according to one of the standards DIN EN ISO 868, DIN ISO 7619-1 and/or ASTM D2240-00. In particular, the Shore hardness A is determined according to DIN 53505.

It can be advantageous if the Shore hardness A of the bonding substance alone and/or the Shore hardness A of the bonding substance/solvent mixture is approximately 20 or more, in particular approximately 30 or more.

It can be advantageous if the Shore hardness A of the bonding substance alone and/or the Shore hardness A of the bonding substance/solvent mixture is approximately 90 or less, in particular approximately 80 or less.

The bonding substance is preferably electrically insulating. In particular, the bonding substance/solvent mixture is electrically insulating.

In particular, the bonding substance is electrically insulating after the first activation. Additionally or alternatively, the bonding substance is electrically insulating after the second activation.

It can be favorable if the resin material comprises or is formed from an epoxy resin material and/or a thermosetting polymer material.

Phenolic resin polymer materials are particularly suitable as thermosetting polymer materials.

It can be advantageous if a phenolic resin polymer material having a formaldehyde/phenol ratio of less than 1:1 is used as the resin material.

Such phenolic resin polymer materials can preferably be obtained by acidic condensation of the starting materials.

For example, the resin material comprises or is formed from novolak. Novolaks are preferably thermoplastic and can be cured by the addition of formaldehyde sources such as hexamethyltetraamine.

It can be advantageous if a proportion of the resin material in the bonding substance is approximately 1 vol. % or more, in particular approximately 2 vol. % or more. The proportion is preferably based on the total volume of the bonding substance or based on the total volume of the bonding substance/solvent mixture.

The proportion of the resin material in the bonding substance is preferably approximately 15 vol. % or less, in particular approximately 10 vol. % or less, based on the total volume of the bonding substance or on the total volume of the bonding substance/solvent mixture.

It can be advantageous if a proportion of the resin material in the bonding substance is approximately 1 wt. % or more, in particular approximately 2 wt. % or more. The proportion is preferably based on the total mass of the bonding substance or based on the total mass of the bonding substance/solvent mixture.

The proportion of the resin material in the bonding substance is preferably approximately 15 wt. % or less, in particular approximately 10% wt. % or less, based on the total mass of the bonding substance or on the total mass of the bonding substance/solvent mixture.

For improved applicability of the bonding substance, it can—as already mentioned—be favorable if the bonding substance is mixed with a solvent before the one or more metal sheets are coated.

A proportion of the solvent is preferably approximately 65 vol. % or more, in particular approximately 70 vol. % or more, based on the total volume of the bonding substance/solvent mixture.

The proportion of the solvent is preferably approximately 95 vol. % or less, in particular approximately 90 vol. % or less, based on the total volume of the bonding substance/solvent mixture.

A proportion of the solvent is preferably approximately 65 wt. % or more, in particular approximately 70 wt. % or more, based on the total mass of the bonding substance/solvent mixture.

The proportion of the solvent is preferably approximately 95 wt. % or less, in particular approximately 90 wt. % or less, based on the total mass of the bonding substance/solvent mixture.

It can be advantageous if the bonding substance is substantially free of starting material after the second activation.

A reaction conversion of a crosslinking reaction of the bonding substance after the second activation is preferably approximately 40% or more, in particular approximately 50% or more, for example approximately 60% or more.

The reaction conversion of the crosslinking reaction of the bonding substance after the second activation is preferably approximately 90% or less, in particular approximately 80% or less, for example approximately 70% or less.

The solvent with which the bonding substance is mixed comprises or is formed from in particular one or more medium-volatile to highly volatile organic solvents.

An evaporation number of the solvent, determined in particular according to DIN 53170, is preferably approximately 300 or less, in particular approximately 280 or less, for example approximately 250 or less.

It can be advantageous if the evaporation number of the solvent is approximately 7 or more, in particular approximately 8 or more, for example approximately 10 or more.

In particular, the evaporation number indicates a ratio of a time in which a substance to be tested evaporates completely and a time in which diethyl ether evaporates completely.

According to a preferred embodiment, the solvent comprises or is formed from a mixture of methoxypropyl acetate and butyl acetate.

A volume ratio of methoxypropyl acetate and butyl acetate is preferably 10:1 or less, in particular approximately 8:1 or less, in particular approximately 6:1 or less.

The volume ratio of methoxypropyl acetate and butyl acetate is preferably approximately 2:1 or more, in particular approximately 3:1 or more, for example approximately 4:1 or more.

For example, methoxypropyl acetate and butyl acetate are mixed in a volume ratio of approximately 1:1.

For optimized adhesion of the bonding substance to the one or more metal sheets, it can be advantageous if the bonding substance comprises an adhesion promoter.

The adhesion promoter preferably comprises or is formed from an organically functionalized silane. The adhesion promoter preferably comprises or is formed from an aminosilane.

Additionally or alternatively to aminosilanes, epoxysilanes are preferably used as organically functionalized silanes.

Preferably, the wettability of surfaces of the metal sheets to be coated can be increased by using the adhesion promoter.

The adhesion promoter in particular promotes the formation of chemical bonds between the surfaces of the metal sheets and components of the bonding substance.

The pre-coating of the multiple metal sheets can act as an adhesion promoter.

A proportion of the adhesion promoter is preferably approximately 0.5 vol. % or more, in particular approximately 1 vol. % or more, based on the total volume of the bonding substance or based on the total volume of the bonding substance/solvent mixture.

The proportion of the adhesion promoter is preferably approximately 6 vol. % or less, in particular approximately 5 vol. % or less, based on the total volume of the bonding substance or based on the total volume of the bonding substance/solvent mixture.

The proportion of the adhesion promoter is preferably approximately 0.5 vol. % or more, in particular approximately 1 vol. % or more, based on the total mass of the bonding substance or based on the total mass of the bonding substance/solvent mixture.

The proportion of the adhesion promoter is preferably approximately 6 wt. % or less, in particular approximately 5% wt. % or less, based on the total mass of the bonding substance or based on the total mass of the bonding substance/solvent mixture.

The bonding substance is preferably selected in such a way that a modulus of elasticity of the bonding substance alone and/or a modulus of elasticity of the bonding substance/solvent mixture is approximately 100 N/mm$^2$ or more, in particular approximately 300 N/mm$^2$.

The modulus of elasticity of the bonding substance alone and/or the modulus of elasticity of the bonding substance/solvent mixture is preferably approximately 1000 N/mm$^2$ or less, in particular approximately 800 N/mm$^2$ or less.

The stated moduli of elasticity preferably refer to a measurement at approximately 20° C.

It can be advantageous if the bonding substance, in particular as a bonding substance/solvent mixture, is applied to the one or more metal sheets by means of one or more of the following coating methods: spraying, brushing, pouring.

A preferred composition of the bonding substance consists of an acrylonitrile butadiene rubber, novolak and aminosilane. To prepare the bonding substance/solvent mixture, a mixture of methoxypropyl acetate and butyl acetate is preferably added to the bonding substance.

The multiple sheet-metal laminate units preferably have an at least approximately round basic shape perpendicularly to their main extension planes.

It can be advantageous if the multiple sheet-metal laminate units each have an at least approximately circular opening in the center. In particular, each opening is concentric with an outer circumference of the relevant sheet-metal laminate unit in a plan view.

It can be favorable if the multiple sheet-metal laminate units have multiple recesses toward one edge, in particular arranged regularly in the circumferential direction. The multiple recesses are e.g. passage openings.

The multiple recesses are preferably arranged annularly.

In particular, the multiple recesses are at least approximately elongate, with their main extension directions each extending in radial directions with respect to a central axis of the relevant sheet-metal laminate unit. The central axis is preferably a middle axis through the centrally located opening.

The openings and/or the multiple recesses in the individual sheet-metal laminates are preferably arranged substantially congruently in the stack of metal sheets.

The invention also relates to a stack of metal sheets, in particular a rotor core and/or a stator core, comprising multiple sheet-metal laminate units. One or more sheet-metal laminate units preferably comprise exactly three metal sheets, each of which is coated on both sides with a bonding substance. The stack of metal sheets is produced in particular using a method according to the invention.

One or more of the features and/or advantages mentioned in connection with the method according to the invention preferably apply equally to the stack of metal sheets according to the invention.

A thickness of each metal sheet perpendicularly to its main extension plane can be at most approximately 0.3 mm, in particular at most approximately 0.25 mm, in particular at most 0.2 mm.

It can be favorable if the metal sheets of the sheet-metal laminate units are flat perpendicularly to and/or in parallel with a main extension plane of at least one metal sheet.

Additionally or alternatively, the metal sheets and/or sheet-metal laminate units are free of projections and/or recesses.

So-called "interlocks" to prevent the metal sheets and/or sheet-metal laminate units from shifting in a direction extending in a relevant main extension plane of the metal sheets and/or sheet-metal laminate units are preferably not required.

It can be advantageous if the stack of metal sheets is fluid-tight, in particular in directions extending transversely to the main extension planes of the metal sheets.

In particular due to an elasticity and/or a flexibility of the bonding substance after a crosslinking reaction, the stack of metal sheets preferably exhibits transverse tightness.

It can be favorable if a transition between the metal sheets and the bonding substance is designed to be fluid-tight, in particular permanently.

Due to the fluid-tightness, creeping and/or migration of fluids, for example cooling medium and/or oil, through the stack of metal sheets can be prevented.

For example, micro-movements of the metal sheets can be accommodated and/or absorbed by the bonding substance. In this way, the bond between the bonding substance and the metal sheets can remain unchanged over the service life of the stack of metal sheets.

The invention also relates to a machine component, in particular a rotor and/or a stator, comprising one or more stacks of metal sheets, produced using a method according to the invention and/or comprising one or more stacks of metal sheets according to the invention.

One or more of the features and/or advantages mentioned in connection with the method according to the invention or the stack of metal sheets according to the invention preferably apply equally to the machine component according to the invention.

The invention also relates to an electric motor, comprising a housing, a rotor and a stator, with the rotor and/or the stator being machine components according to the invention.

One or more of the features and/or advantages mentioned in connection with the method according to the invention or the stack of metal sheets according to the invention preferably apply equally to the electric motor according to the invention.

The electric motor is used in particular in a vehicle, for example a motor vehicle.

It can be favorable if the electric motor has a cooling device which comprises a cooling medium guide which extends on a side of the stator facing away from the rotor and/or is delimited by the stator.

In particular, a cooling medium guided by means of the cooling device is in direct physical and/or thermal contact with the stator.

The stator can be directly subjected to a flow in particular from the outside by means of the cooling device.

A stator support is preferably not required.

Additionally or alternatively to the cooling medium guide for direct cooling of the stator, the cooling device comprises in particular a cooling medium guide element which extends in particular directly along the rotor on a side of the rotor facing away from the stator. The cooling medium guide element is partially or completely formed by a wall of the rotor, for example.

For example, the cooling medium guide element is guided through a radially inner interior space of the rotor.

"Radially inner" preferably refers to a middle axis and/or axis of symmetry of the rotor.

Internal cooling of the rotor can thus be implemented.

It can be advantageous if one or more stator cores and/or one or more rotor cores are fixed to a housing, for example of an electric motor, by electromagnetic forming.

In particular, the one or more stator cores and/or the one or more rotor cores are pressed onto the housing.

Additionally or alternatively, the housing itself can also be produced by electromagnetic forming.

A layer or layer system comprising or formed from at least one ceramic material can be arranged between the housing and the one or more rotor cores and/or the one or more stator cores.

Further features and/or advantages of the invention are described in the following description and the drawings which illustrate embodiments.

The same or functionally equivalent elements are provided with the same reference signs in all the figures.

DETAILED DESCRIPTION OF THE DRAWINGS

Figure 1:
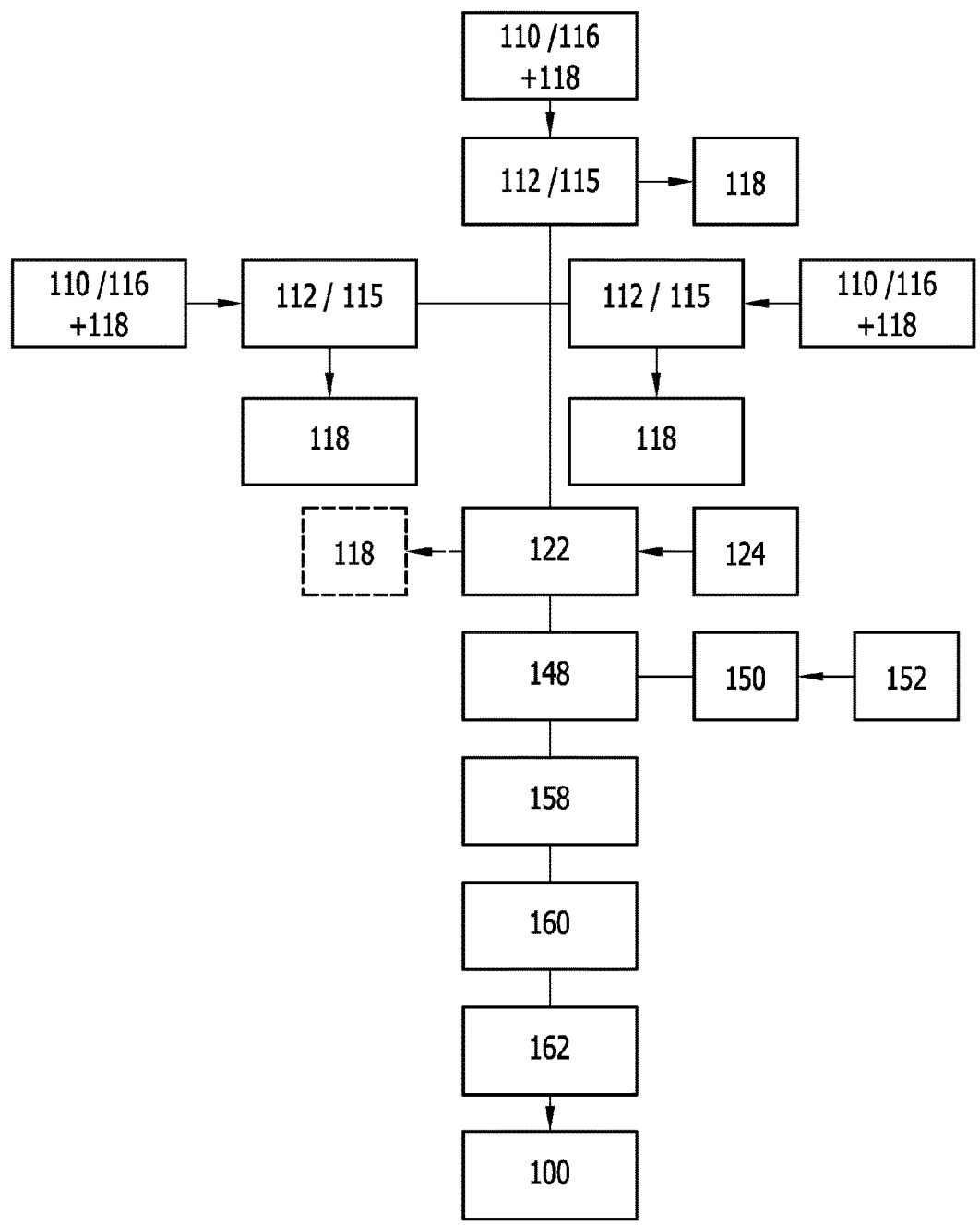
FIG. 1 is a schematic representation of a sequence of a method for producing one or more stacks of metal sheets, in which three metal sheets wound up into rolls are integrally bonded together.
Figure 2:
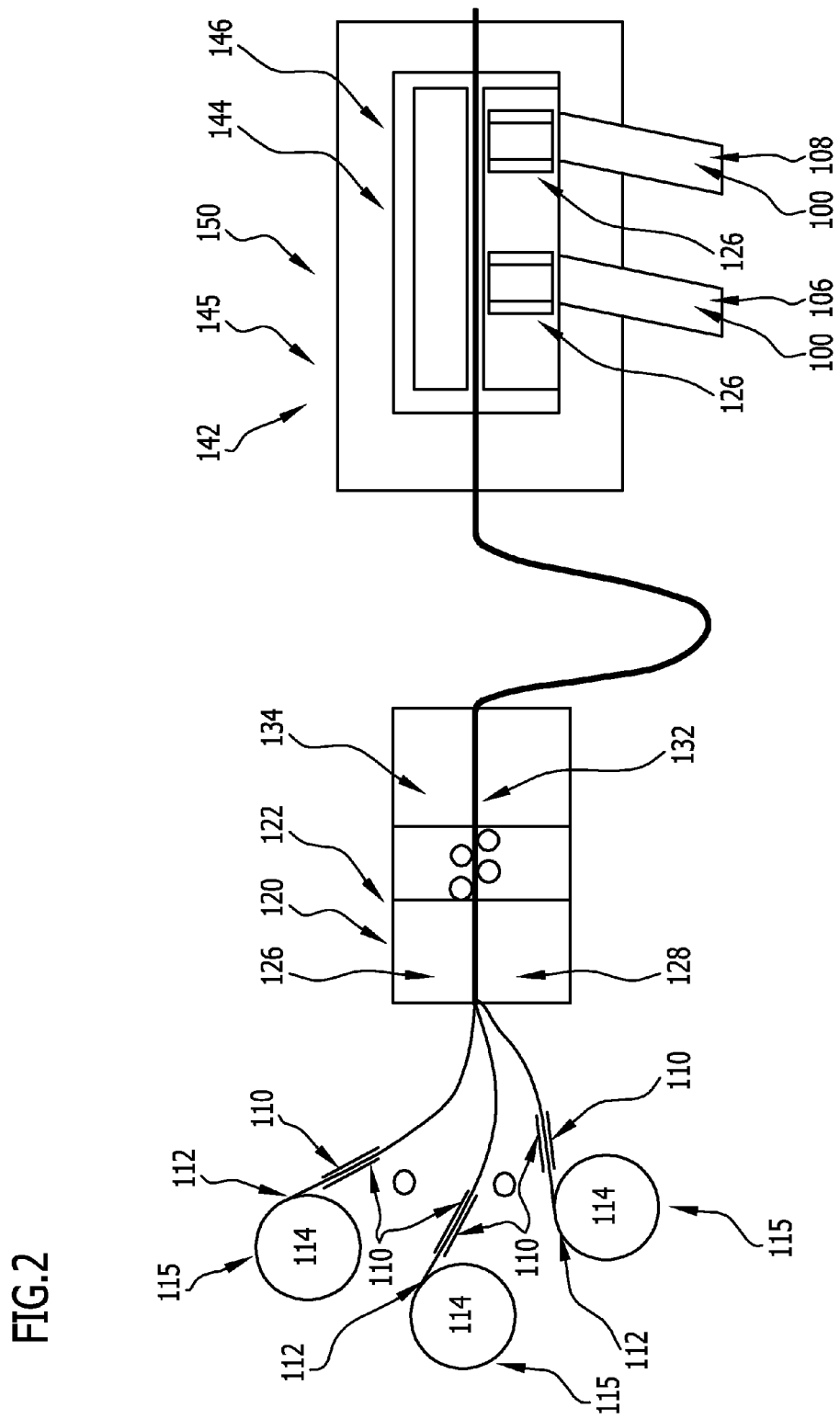
FIG. 2 is a further schematic representation of the method from FIG. 1.
Figure 3:
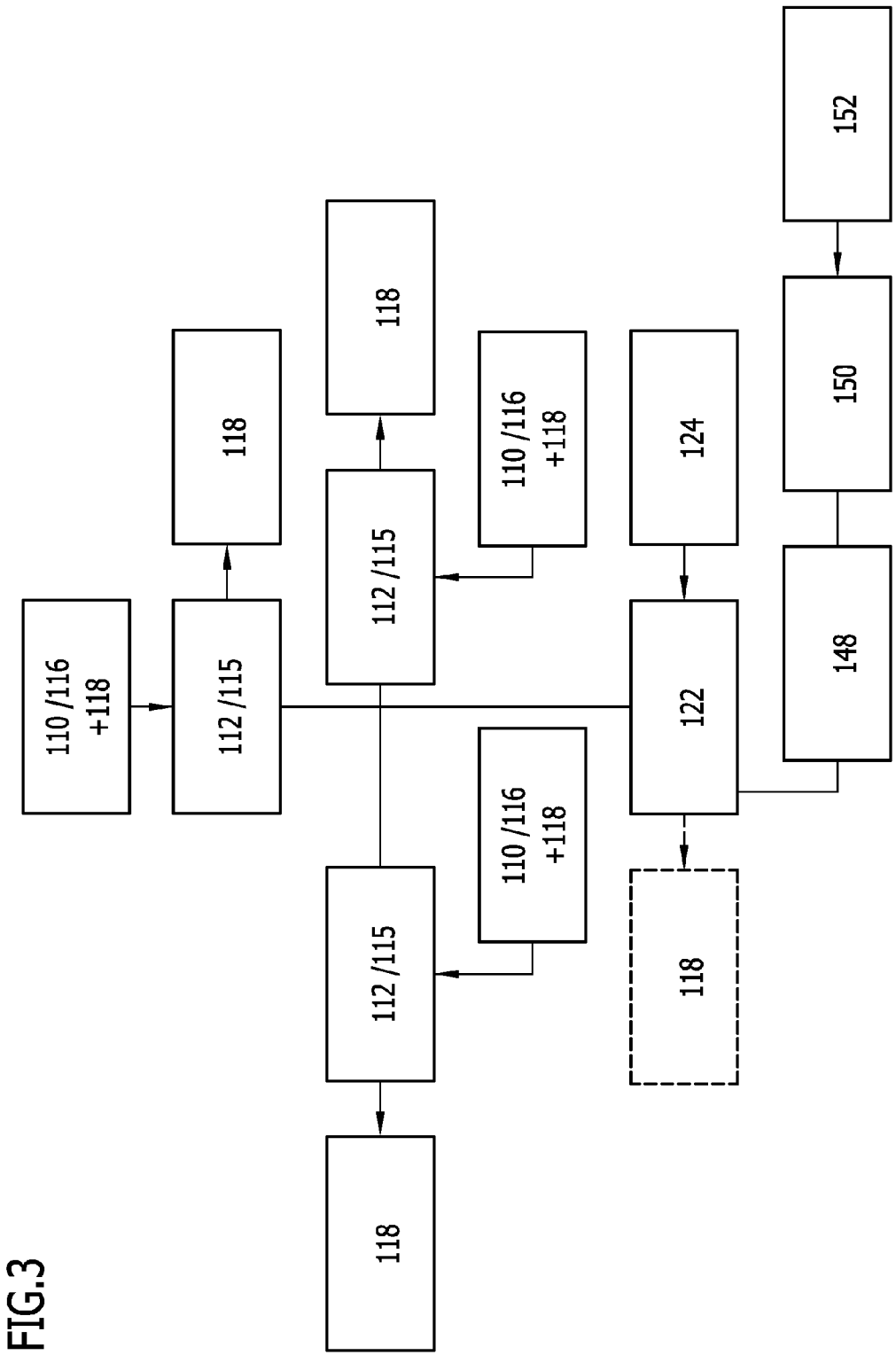
FIG. 3 is a schematic representation of a detail of the method from FIGS. 1 and 2.

A sequence of a method for producing a stack 100 of metal sheets is shown schematically in FIGS. 1 to 3. With the method, a series production of stacks 100 of metal sheets can be formed.

The stacks 100 of metal sheets are preferably stacks 102 of electrical steel sheets, for example laminated electrical steel cores 104. The laminated electrical steel cores 104 are preferably used as rotor cores 106 and/or stator cores 108 in rotors 101 and/or stators 103 (shown schematically in FIG. 5).

The rotors 101 and/or stators 103 preferably form machine components of an electric motor 105 (shown purely schematically).

The electric motor 105 is preferably an electric motor of a vehicle, for example a motor vehicle.

In a first method step, a bonding substance 110 is preferably applied and/or deposited onto one or more metal sheets 112.

The metal sheets 112 form e.g. laminations in a resulting stack 100 of metal sheets.

In the present case, three metal sheets 112 are each provided with a coating of the bonding substance 110 on both sides. In this case, in particular a layer having a substantially homogeneous thickness is formed perpendicularly to a main extension plane of the relevant metal sheet 112.

The metal sheets 112 are preferably metal sheets 112 which comprise or are formed from metal materials.

The metal sheets 112 are preferably electrical steel sheets 115. For example, the metal sheets 112 are made of iron-silicon alloy(s) and/or processed into a flat material by cold rolling.

It can be favorable if metal sheets 112 are used which already have a pre-coating before being coated with the bonding substance 110. The pre-coating is in particular designed to be electrically insulating.

The pre-coating preferably comprises one or more of the following substances or is formed from one or more of the following substances: polyvinyl butyral, polyamide, polyester, modified polyamide, epoxy.

The pre-coating is used in particular to promote adhesion of the bonding substance 110 to the metal sheets 112.

For example, the metal sheets 112 are each coated on both sides with a so-called "baking lacquer" which can facilitate mechanical processing in particular. For example, NO20 is used as a pre-coating.

For series production, it can be advantageous if the metal sheets 112 are wound up into a roll 114. For example, the metal sheets 112 are provided as coil material.

A width of the rolls 114 and/or coils is preferably in a range of from approximately 150 mm to approximately 200 mm. The width is defined in particular transversely to a winding direction.

As can be seen in particular in FIG. 2, the metal sheets 112 are in particular unwound before the metal sheets 112 are coated with the bonding substance 110. The metal sheets 112 are preferably coated with the bonding substance 110 on both sides.

The coating with the bonding substance 110 is preferably carried out in an in-line process and/or continuously.

The bonding substance 110 is preferably an adhesive 116 and/or acts like an adhesive 116. The bonding substance 110 is preferably used for the integral bond of the metal sheets 112.

The bonding substance 110 can be applied to the metal sheets 112 with a solvent 118 mixed therein, with the solvent 118 being selected in particular in such a way that it escapes after application.

For this purpose, the solvent 118 is selected for example in such a way that it has a comparatively high vapor pressure, so that it already evaporates at room temperature and room pressure (approximately 1 bar) and/or at a first activation temperature 124.

It has proven to be advantageous if the solvent 118 comprises or is formed from one or more medium-volatile to highly volatile organic solvents.

The solvent 118 is preferably selected such that both a resin material of the bonding substance 110 and an elastomer material of the bonding substance are readily soluble therein.

The solvent 118 preferably has an evaporation number according to DIN 53170 of approximately 300 or less, in particular approximately 280 or less, for example approximately 250 or less.

The solvent 118 preferably has an evaporation number according to DIN 53170 of approximately 7 or more, in particular approximately 8 or more, for example approximately 10 or more.

The evaporation number is preferably a ratio of a time in which a substance completely evaporates and a time in which diethyl ether completely evaporates.

For example, the solvent 118 comprises or is formed from a mixture of methoxypropyl acetate and butyl acetate.

A proportion of methoxypropyl acetate is preferably approximately 5 vol. % or more, in particular approximately 50 vol. % or more, for example approximately 75 vol. % or more, based on a total volume of the solvent 118.

Alternatively, the proportion of methoxypropyl acetate in the solvent 118 is preferably approximately 75 vol. % or less, in particular approximately 50 vol. % or less, for example approximately 5 vol. % or less, based on the total volume of the solvent 118.

It can be advantageous if a proportion of the solvent 118 in a bonding substance/solvent mixture is approximately 65 vol. % or more, in particular approximately 70 vol. % or more.

The proportion of the solvent 118 in the bonding substance/solvent mixture is preferably approximately 95 vol. % or less, in particular approximately 90 vol. % or less.

The percentages are preferably based on a total volume of the resulting bonding substance/solvent mixture.

It can be advantageous if a proportion of the solvent 118 in a bonding substance/solvent mixture is approximately 65 wt. % or more, in particular approximately 70 wt. % or more.

The proportion of the solvent 118 in the bonding substance/solvent mixture is preferably approximately 95 wt. % or less, in particular approximately 90 wt. % or less.

The percentages are preferably based on a total mass of the resulting bonding substance/solvent mixture.

Preferably, the bonding substance 110 is substantially completely dissolved in the solvent 118 and/or distributed homogeneously therein.

Depending on the viscosity of the bonding substance/solvent mixture, it can be favorable if the bonding substance 110 is mixed with the solvent 118 to form the bonding substance/solvent mixture and is applied to the one or more metal sheets 112 by means of one or more of the following coating methods: spraying, brushing, pouring.

The bonding substance 110 and/or the solvent 118 are preferably selected in such a way that the bonding substance alone and/or the bonding substance/solvent mixture has a Shore A hardness of approximately 20 or more, in particular approximately 30 or more.

The Shore hardness A of the bonding substance 110 alone and/or the Shore hardness A of the bonding substance/solvent mixture is preferably approximately 90 or less, in particular approximately 80 or less.

For example, the Shore hardness A of the bonding substance 110 after a first activation 122 and/or a second activation 150 and/or before the first activation in the bonding substance/solvent mixture is in a range of from approximately 30 to approximately 80.

The bonding substance 110 is preferably selected in such a way that it is electrically insulating after the first activation 122 and/or after the second activation 150.

The mechanical properties mentioned are preferably present in a bonding substance 110 which comprises a resin material and an elastomer material.

It can be favorable if the elastomer material comprises or is formed from a synthetic rubber material. For example, the elastomer material comprises an acrylonitrile butadiene rubber and/or a styrene butadiene rubber.

According to a preferred embodiment, the elastomer material is an acrylonitrile butadiene rubber.

A proportion of the elastomer material, in particular the acrylonitrile butadiene rubber, is preferably approximately 1 vol. % or more, in particular approximately 5 vol. % or more, based on a total volume of the bonding substance 110 or based on the total volume of the bonding substance/solvent mixture.

The proportion of the elastomer material, in particular the acrylonitrile butadiene rubber, is preferably approximately 25 vol. % or less, in particular approximately 20 vol. % or less, based on the total volume of the bonding substance 110 or based on the total volume of the bonding substance/solvent mixture.

A proportion of the elastomer material, in particular the acrylonitrile butadiene rubber, is preferably approximately 1 wt. % or more, in particular approximately 5 wt. % or more, based on a total mass of the bonding substance 110 or based on the total mass of the bonding substance/solvent mixture.

The proportion of the elastomer material, in particular the acrylonitrile butadiene rubber, is preferably approximately 25 wt. % or less, in particular approximately 20 wt. % or less, based on the total mass of the bonding substance 110 or based on the total mass of the bonding substance/solvent mixture.

Due to the proportion of the elastomer material, the bonding substance 110 is preferably designed in such a way that micro-movements can be accommodated and/or absorbed by it.

For the second activation 150 at a second temperature 152 that is increased compared to a first temperature 124 in the first activation 122, it can be advantageous if the bonding substance 110 comprises a resin material.

Preferably, a proportion of the resin material in the bonding substance 110 is approximately 1 vol. % or more, in particular approximately 2 vol. % or more, based on the total volume of the bonding substance 110 or based on the total volume of the bonding substance/solvent mixture.

The proportion of the resin material in the bonding substance 110 is preferably approximately 15 vol. % or less, in particular approximately 10 vol. % or less, based on the total volume of the bonding substance 110 or based on the total volume of the bonding substance/solvent mixture.

A proportion of the resin material in the bonding substance 110 is preferably approximately 1 wt. % or more, in particular approximately 2 wt. % or more, based on the total mass of the bonding substance 110 or based on the total mass of the bonding substance/solvent mixture.

The proportion of the resin material in the bonding substance 110 is preferably approximately 15 wt. % or less, in particular approximately 10 wt. % or less, based on the total mass of the bonding substance 110 or based on the total mass of the bonding substance/solvent mixture.

An epoxy resin material and/or a thermosetting polymer material have proven to be particularly preferred resin materials.

It can be favorable if the bonding substance 110 comprises or is formed from a phenolic resin polymer material, in particular a novolak, as the resin material.

Novolaks are preferably phenolic resins having a formaldehyde/phenol ratio of less than 1:1.

For improved adhesion of the bonding substance 110 to the metal sheets 112, it can be advantageous if the bonding substance 110 comprises an adhesion promoter.

The adhesion promoter preferably comprises an organically functionalized silane, in particular an aminosilane, or is formed from an organically functionalized silane, in particular an aminosilane.

As an alternative or in addition to aminosilanes, epoxysilanes can also be used as organically functionalized silanes.

It can be advantageous if a proportion of the adhesion promoter is approximately 0.5 vol. % or more, in particular approximately 1 vol. % or more, based on the total volume of the bonding substance 110 or based on the total volume of the bonding substance/solvent mixture.

The proportion of the adhesion promoter is preferably approximately 6 vol. % or less, in particular approximately 5 vol. % or less, based on the total volume of the bonding substance 110 or based on the total volume of the bonding substance/solvent mixture.

It can be advantageous if the proportion of the adhesion promoter is preferably approximately 0.5 vol. % or more, in particular approximately 1 vol. % or more, based on the total mass of the bonding substance 110 or based on the total mass of the bonding substance/solvent mixture.

The proportion of the adhesion promoter is preferably approximately 6 wt. % or less, in particular approximately 5% wt. % or less, based on the total mass of the bonding substance 110 or based on the total mass of the bonding substance/solvent mixture.

A modulus of elasticity of the bonding substance 110 and/or a modulus of elasticity of the bonding substance/solvent mixture is preferably approximately 100 N/mm$^2$ or more, in particular approximately 300 N/mm$^2$ or more.

The modulus of elasticity of the bonding substance 110 and/or of the bonding substance/solvent mixture is preferably approximately 1000 N/mm$^2$ or less, in particular approximately 800 N/mm$^2$ or less.

A particularly preferred composition of the bonding substance/solvent mixture consists substantially of a mixture of acrylonitrile butadiene rubber, novolak, aminosilane and, as a solvent, a mixture of methoxypropyl acetate and butyl acetate.

After the metal sheets 112 have been coated with the bonding substance 110, the metal sheets 112 are preferably brought together and/or arranged one above the other so that in particular main extension planes of the metal sheets 112 are arranged at least approximately in parallel with one another.

In particular, due to the proportion of elastomer material in the bonding substance 110, the stack 100 of metal sheets is preferably fluid-tight in directions extending transversely to the main extension planes of the metal sheets 112. The stack 100 of metal sheets is in particular transversely tight.

For example, the stack 100 of metal sheets is fluid-tight (excluding openings for guiding the cooling medium) in a main flow direction of a cooling medium, for example cooling water.

The bonding substance 110 can accommodate and/or absorb micro-movements in particular without damage. In particular, the stack 100 of metal sheets is fluid-tight over the entire service life of the electric motor 105.

In embodiments in which the metal sheets 112 are electrical steel sheets 115, it can be advantageous if the electrical steel sheets 115 are preferably arranged one above the other in such a way that a main grain orientation direction of different electrical steel sheets 115 varies in a stacking direction.

For example, main grain orientation directions of electrical steel sheets 115 arranged one above the other in the stacking direction enclose an angle with one another of approximately 30° or more, in particular approximately 50° or more.

In particular, main grain orientation directions of electrical steel sheets 115 arranged one above the other in the stacking direction enclose an angle with one another of approximately 120° or less, in particular approximately 100° or less.

For example, electrical steel sheets 115 arranged one above the other in the stacking direction are arranged alternately longitudinally and transversely with respect to their main grain orientation directions. In this way, optimum use can be made of a pressing space in which the electrical sheets are pressed together and/or pressed against each other, preferably after coating.

A thickness of the coating with the bonding substance 110 is preferably selected such that a ratio of the thickness of the metal sheets 112 perpendicularly to their main extension plane and a layer thickness of the bonding substance 110 perpendicularly to the main extension plane of the metal sheets 112 after and/or before the escape of the solvent 118 is approximately 20:1 or more, in particular approximately 25:1 or more.

The ratio of the thickness of the metal sheets 112 and the layer thickness of the bonding substance 110 is preferably approximately 250:1 or less, in particular approximately 220:1 or less.

For example, a ratio of the thickness of a metal sheet 112 to the layer thickness of a layer of the bonding substance 110 is in a range of approximately 200:1 and approximately 28.55:1.

It can be advantageous if the thickness of the metal sheets 112 is approximately 0.2 mm and a layer thickness of the bonding substance 110 is approximately 1 μm or approximately 7 μm.

For example, metal sheets 112 with a thickness perpendicular to their main extension plane of preferably 0.5 mm or less, in particular approximately 0.3 mm or less, are used.

The thickness of the metal sheets 112 is preferably approximately 0.05 mm or more, in particular approximately 0.15 mm or more.

The layer thickness of the bonding substance 110 after application and/or after the first activation 122 is preferably approximately 1 μm or more, in particular approximately 3 μm or more, for example approximately 5 μm or more.

After the application and/or after the first activation 122, the layer thickness of the bonding substance 110 is preferably approximately 9 μm or less, in particular approximately 8 μm or less, for example approximately 7 μm or less.

For example, the layer thickness of the bonding substance 110 is approximately 6 μm on average on one side of the relevant metal sheet 112 and/or collectively on both sides of the relevant metal sheet 112.

The sheet-metal laminate units 140 and/or metal sheets 112 are preferably formed without so-called "interlocks." The "interlocks" are in particular arranged perpendicularly to and/or in parallel with a main extension plane of a metal sheet 112.

In particular, the metal sheets 112 and/or the sheet-metal laminate units 140 have no projections and/or recesses, in particular perpendicularly and/or in parallel with a relevant main extension plane. This excludes in particular openings and/or recesses in the metal sheets 112 for forming a rotor shape and/or stator shape.

It can be favorable if a local thickness variation of the metal sheets 112 and/or sheet-metal laminate units 140 is approximately 5% or less, in particular approximately 2% or less, based on an average thickness of the relevant metal sheet 112 and/or the relevant sheet-metal laminate unit 140.

The local thickness variation is preferably independent of openings and/or recesses in the metal sheets 112 and/or sheet-metal laminate units 140.

For example, the metal sheets 112 and/or sheet-metal laminate units 140 and/or sheet-metal laminates 132 are flat.

The metal sheets 112 coated with the bonding substance 110, in particular on both sides, are preferably arranged and/or stacked one on top of the other in such a way that, between the central metal sheet 112 in the stacking direction and the two outer metal sheets 112, two layers of the bonding substance 110 are directly adjacent and/or bonded together.

It can be favorable if the metal sheets 112 which are arranged one above the other and are coated with the bonding substance 110 are fed to a reaction chamber 120 in which the first activation 122 of the bonding substance 110 is carried out.

The first activation 122 preferably takes place in-line and/or while the metal sheets 112 are being guided through the reaction chamber 120.

It can be favorable if the first activation 122 is a thermal activation in which the bonding substance 110 and/or the metal sheets 112 are heated to a first temperature 124.

For example, the metal sheets 112 coated with the bonding substance 110 and arranged one above the other are guided through a heating device 126. The heating device preferably heats the bonding substance 110 and/or the metal sheets 112 to the first temperature 124.

An infrared heating device 128, for example an infrared radiator, is particularly suitable as the heating device 126.

Alternatively or additionally, resistance heating devices and/or induction heating devices can also be used to heat the bonding substance 110 and/or the metal sheets 112.

The first activation 122 is preferably carried out at a temperature of 50° C. or more, in particular 55° C. or more.

The first temperature 124 during the first activation 122 is preferably approximately 90° C. or less, in particular approximately 85° C. or less.

During the first activation 122, integral bonding preferably takes place between adjacent layers of the bonding substance 110. The integral bond is based in particular predominantly on adhesion forces.

This first activation 122 at the first temperature 124 preferably leads to an integral bond of the layers of the bonding substance 110 between the metal sheets 112. The bond is established in particular as a result of a chemical and/or physical reaction of an elastomer material of the bonding substance 110.

During the first activation 122, it can be advantageous if the heated metal sheets 112 coated with the bonding substance 110 are pressed together and/or compressed.

The pressing together and/or compression can take place, for example, by guiding the metal sheets 112 between rollers (cf. FIG. 2). In particular, the rollers generate an at least approximately constant contact pressure between the individual metal sheets 112.

The first activation 122 preferably produces a sheet-metal laminate 132 which comprises the—in this case three—metal sheets 112 which are integrally bonded together by means of the bonding substance 110.

Alternatively or in addition to a thermal activation, the first activation 122 can also be an activation by pressure and/or a chemical activation.

In the case of activation by pressure, the reaction chamber 120 in which the first activation 122 is carried out can be subjected to an overpressure or a negative pressure.

Additionally or alternatively, the metal sheets 112 to be bonded can be pressed together, for example as described above.

In the case of a chemical activation, the bonding substance 110 is preferably brought into contact with a reaction initiator and/or a reaction initiator is added at the time of the first activation 122.

A reaction initiator is a crosslinking agent and/or a radical initiator, for example.

Pre-consolidation preferably takes place as a result of the first activation 122.

After the metal sheets 112 have been integrally bonded to form the sheet-metal laminate 132, the sheet-metal laminate 132 is preferably guided through a cooling device 134.

The cooling device 134 can be designed as an active cooling channel which is used to dry and/or cool the sheet-metal laminate 132 to room temperature (approximately 20° C.).

During drying, any remaining solvent 118 preferably evaporates substantially completely (indicated by dashed lines in FIGS. 1 and 3).

The sheet-metal laminate 132 can be wound up, in particular after it has been guided through the cooling device 134.

Before a method step following the production of the sheet-metal laminate 132, the sheet-metal laminate 132 is preferably unwound again if it has been wound up.

After the sheet-metal laminate 132 has been produced, the sheet-metal laminate 132 is preferably cut up to produce multiple sheet-metal laminate units 140 and/or multiple sheet-metal laminate units 140 are separated from the sheet-metal laminate 132.

For this purpose, the sheet-metal laminate 132 is preferably fed to a tool 142 which comprises a punching tool 144.

The punching tool 144 preferably comprises two tool halves, each of which is equipped with one or more blade elements (not shown). By pressing the two tool halves of the punching tool 144 together, a predetermined shape is separated and/or cut out of the sheet-metal laminate 132, preferably using the blade elements.

For minimized edge indentation, it can be advantageous if the sheet-metal laminate 132 is preheated, in particular before punching.

For example, a region of the sheet-metal laminate 132 in which one or more blade elements of the punching tool 144 intersect is preheated. This region is a cutting edge region, for example.

The preheating is preferably carried out by means of a laser.

For an optimized method, it can be advantageous if the punching tool 144 is integrated into a pressing tool 145, for example a press.

The pressing tool 145 is preferably used to press and/or push together multiple sheet-metal laminate units 140 during a second activation 150 of the bonding substance 110.

A fine punching tool 146 is preferably used as the punching tool 144. For example, a fine punching unit from Webo Werkzeugbau Oberschwaben GmbH is integrated into a conventional press.

The punching is indicated schematically in FIGS. 1 and 3 with reference sign 148.

It can be the case that the sheet-metal laminate 132 is completely cut up by the punching 148 or the material is first weakened by the punching tool 144 and the sheet-metal laminate 132 is subsequently and/or simultaneously completely cut up by an electromagnetic pulse.

The electromagnetic pulse is generated by an electromagnetic pulse generator, for example. According to this variant of the method, the sheet-metal laminate 132 is electromagnetically formed.

It can be favorable if the punching tool 144 has a stroke per stack of approximately 200 to approximately 350, in particular approximately 250 to approximately 300, for example approximately 275. A "stack" refers in particular to a thickness of a sheet-metal laminate 132 and/or a height of a stack of sheet-metal laminate units 140 and/or a thickness of the stack 100 of metal sheets.

The thickness of the sheet-metal laminate 132 is preferably defined perpendicularly to its main extension plane.

The height of the stack of sheet-metal laminate units 140 is preferably defined in parallel with the stacking direction.

The thickness of the stack 100 of metal sheets is preferably defined perpendicularly to a main extension plane of a metal sheet 112.

Press-joining of the sheet-metal laminate units 140 can be carried out in the tool 142 before, during and/or after the second activation 150. For example, the sheet-metal laminate units 140 are clinched.

Additionally or alternatively, stacks 100 of metal sheets are clinched.

Multiple sheet-metal laminate units 140 are preferably stacked immediately after the sheet-metal laminate units 140 have been cut up and/or separated.

After stacking, the sheet-metal laminate units 140 are preferably integrally bonded together.

It can be favorable if the integral bond of multiple sheet-metal laminate units 140 still takes place in the tool 142, in particular the pressing tool 145.

In order to integrally bond multiple sheet-metal laminate units 140, the sheet-metal laminate units 140 are preferably stacked one on top of the other so that main extension planes of the metal sheets 112 of the sheet-metal laminate units 140 are arranged substantially in parallel with one another.

As already described in connection with arranging and/or stacking the metal sheets 112 one on top of the other before the first activation 122, sheet-metal laminate units 140 comprising electrical steel sheets 115 can be arranged in such a way that their main grain orientation directions are arranged so as to be offset from one another and/or not in parallel and/or skewed.

The integral bond of the sheet-metal laminate units 140 is preferably effected by the second activation 150 of the bonding substance 110. The second activation 150 is preferably a thermal activation at a second temperature 152 which is in particular higher than the first temperature 124 during the first activation 122 by approximately 30° C. or more, for example approximately 50° C. or more.

In the second activation 150, the stacks of sheet-metal laminate units 140 are preferably heated by one or more heating devices 126.

For example, the bonding substance 110 is heated to a temperature of approximately 120° C. or more, in particular approximately 130° C. or more.

During the second activation 150, in particular, integral bonding takes place due to cohesive forces between layers of the bonding substance 110 arranged on the outsides of the sheet-metal laminate units 140.

A crosslinking reaction of a resin-based portion of the bonding substance 110 preferably takes place during the second activation 150. The second activation 150 is colloquially referred to as "baking."

Additionally or alternatively to a thermal activation, the second activation 150 can be an activation by pressure and/or a chemical activation. With regard to the activation by pressure and the chemical activation, reference is made to the explanations in connection with the first activation 122.

In the present case, the integral bonding of multiple sheet-metal laminate units 140 results in stacks 100 of metal sheets.

For efficient further processing, it can be favorable if the stacks 100 of metal sheets, in particular after they have been removed from the tool 142, are stacked and stored and/or transported further in containers, for example small load carriers.

The stacking of the stacks 100 of metal sheets is indicated schematically in FIG. 1 with reference sign 158.

It can be advantageous if the stack 100 of metal sheets is marked (designated with reference sign 160). For example, data matrix codes are used for marking 160. The marking 160 is carried out for example by laser inscription.

Additionally or alternatively, sheet-metal laminate units 140 may already be marked.

One marking 160 can be made per three stacks 100 of metal sheets.

Before the stacks 100 of metal sheets that have been produced are delivered, quality control 162 is preferably carried out.

Figure 4:
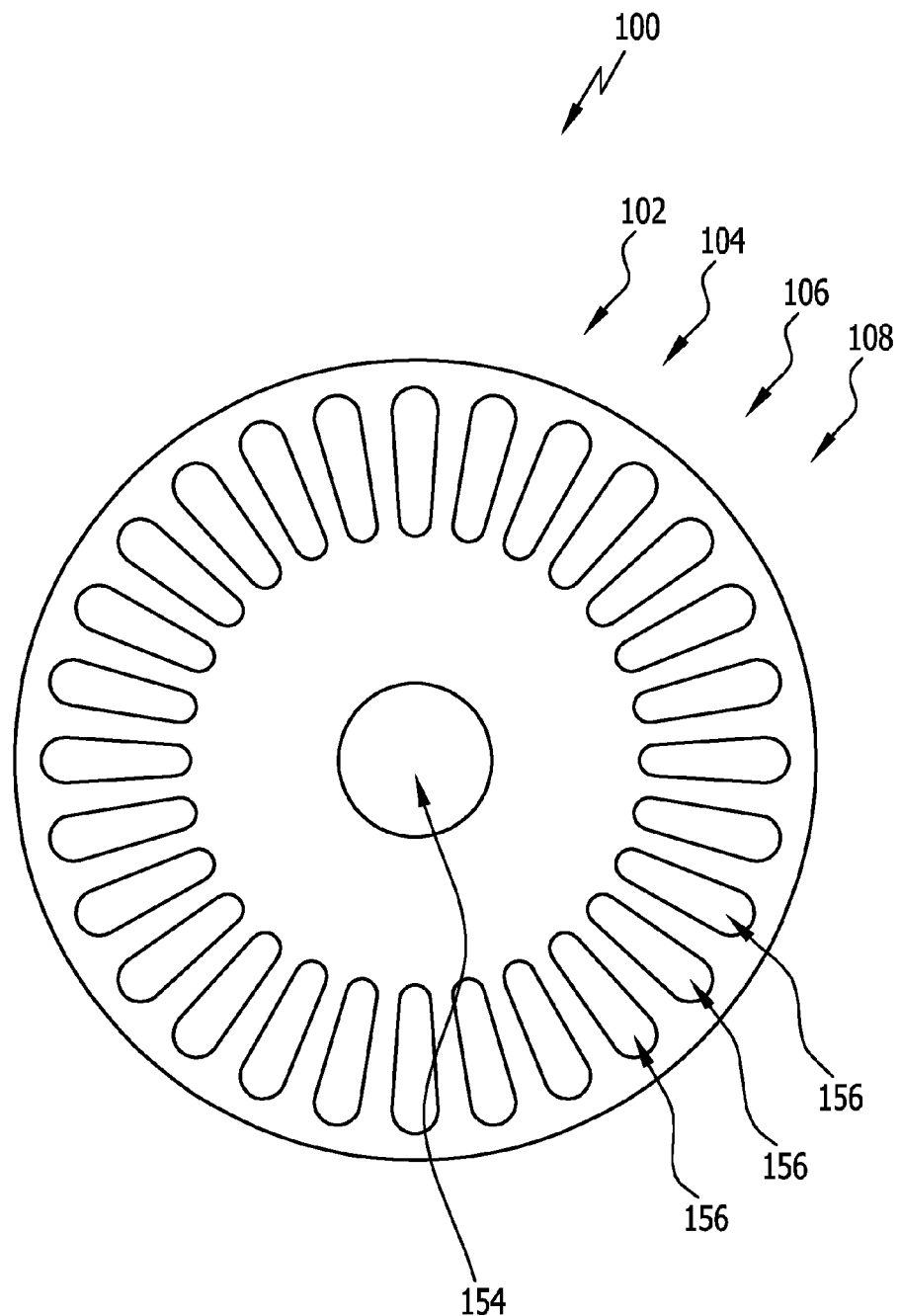
FIG. 4 is a schematic plan view of a stack of metal sheets which was produced in a method shown in FIGS. 1 to 3.

FIG. 4 shows a stack 100 of metal sheets in plan view.

The stack 100 of metal sheets preferably has a substantially round shape when viewed from above and/or comprises a centrally arranged opening 154.

It can be favorable if the stack 100 of metal sheets has annularly arranged recesses 156 in the form of passage openings.

It can be advantageous if each sheet-metal laminate 132 has substantially the same shape. The openings 154 and/or recesses 156 of all sheet-metal laminate units 140 of a stack 100 of metal sheets are preferably arranged substantially congruently in the stack 100 of metal sheets.

To produce an electric motor 105, it can be favorable if a housing (not shown in the drawing) of the electric motor 105 is pressed onto one or more rotor cores 106 and/or one or more stator cores 108 by means of electromagnetic forming.

In this way, the one or more rotor cores 106 and/or the one or more stator cores 108 can be almost hydrostatically placed against the housing.

By hydrostatic forming of the housing, parts produced by means of sheet-metal forming can form part of the housing or the housing can be made entirely of sheet-metal material.

The housing can be a rolled and/or butt-jointed, for example welded, semi-finished product. Preferred semi-finished products are pipes.

In this way, material costs and/or tool costs can be saved. Furthermore, housings can be produced with a constant material thickness profile.

Even contact between the housing and the one or more rotor cores 106 and/or the one or more stator cores 108 and/or improved electrical insulation can increase the efficiency of the electric motor.

A layer or layer system comprising or formed from at least one ceramic material is preferably arranged between the housing and the one or more rotor cores 106 and/or the one or more stator cores 108.

The layer and/or the layer system is preferably thermally conductive and/or electrically insulating.

Figure 5:
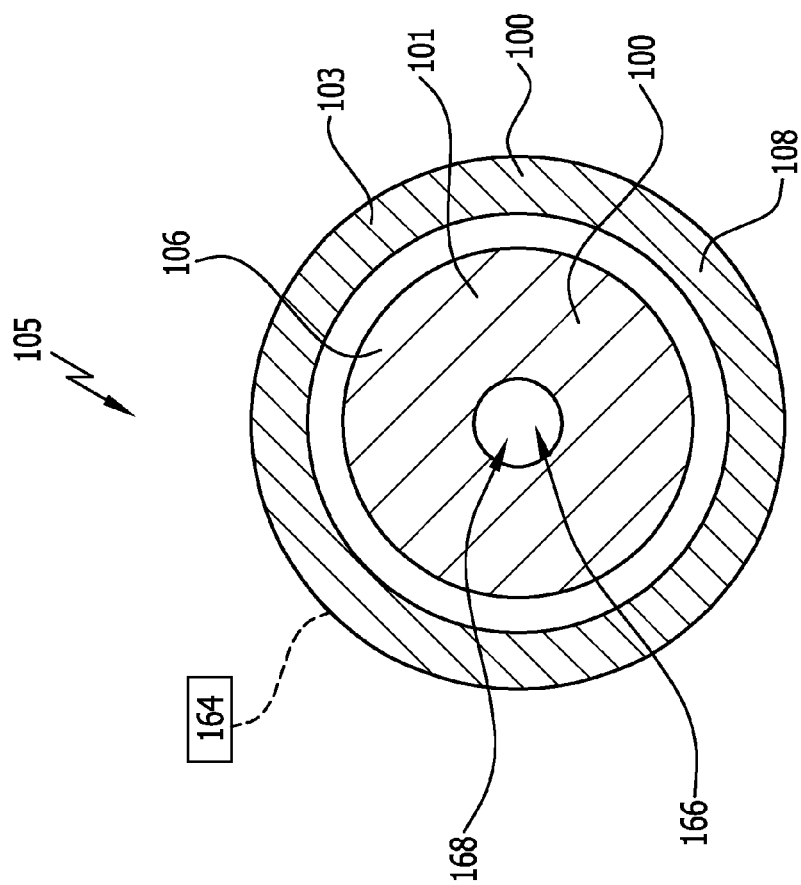
FIG. 5 is a schematic plan view of an electric motor comprising a rotor and a stator.

Due in particular to the fluid-tightness of the stack 100 of metal sheets, an electric motor 105 can be formed which comprises a cooling device 164 (indicated purely schematically) which is formed in such a way that a rotor 101 is cooled from the inside (cf. FIG. 5).

The rotor 101 is preferably cooled by a cooling medium guiding element 166 of the cooling device 164 on a side facing away from the stator 103, with there being in particular direct thermal contact between a cooling medium of the cooling device 164 and the rotor 101.

For example, the cooling device 164 has a cooling medium guide element 166 which is arranged in a, with respect to a middle axis of the rotor 101, radially inner interior space 168 of the rotor 101 and/or surrounds the radially inner interior space 168.

It can be favorable if the stator 103 of the electric motor 105 is cooled (in this case from the outside) on a side facing away from the rotor 101, in particular by a cooling medium guide of the cooling device 164.

Preferably, the guidance of the cooling medium is limited inwardly by the stator 103, in particular in such a way that the cooling medium is guided directly along the stator 103.

For example, the stator 103 can be and/or is supplied directly with a flow of cooling medium by means of the cooling device 164 from the outside.

A stator support is preferably not required.

In the above-described method for producing a stack 100 of metal sheets, integral bonding at two temperature levels is preferably achieved by using a bonding substance which comprises an elastomer material and a resin material, so that in particular two-stage integral bonding can be carried out using only one bonding substance 110.

An integral bonding effect of the bonding substance 110 between the metal sheets 112 which is achieved in a first stage is preferably maintained during the second activation 150, in which multiple sheet-metal laminate units 140 have been integrally bonded together.

The following are preferred embodiments:
1. Method for producing a stack (100) of metal sheets, in particular a laminated electrical steel core (104), wherein the method comprises the following:
    coating one or more metal sheets (112) with a bonding substance (110);
    bonding multiple metal sheets (112) to form a sheet-metal laminate (132) by a first activation (122) of the bonding substance (110);
    cutting up the sheet-metal laminate (132) to produce multiple sheet-metal laminate units (140) and/or cutting out multiple sheet-metal laminate units (140) from the sheet-metal laminate (132); and
    bonding the multiple sheet-metal laminate units (140) to form a stack (100) of metal sheets by a second activation (150) of the bonding substance (110).
2. Method according to embodiment 1, characterized in that one or more parameters differ during the first activation (122) and the second activation (150).
3. Method according to embodiment 1 or 2, characterized in that the first activation (122) and/or the second activation (150) are thermal activations.
4. Method according to any of embodiments 1 to 3, characterized in that the multiple metal sheets (112) which are bonded together are wound up and/or in that the one or more metal sheets (112) are unwound for coating with the bonding substance (110).
5. Method according to any of embodiments 1 to 4, characterized in that, before and/or after the sheet-metal laminate (132) is cut up, multiple sheet-metal laminate units (140) are stacked one on top of the other in a stacking direction so that in particular a stack of sheet-metal laminate units (140) is formed.
6. Method according to any of embodiments 1 to 5, characterized in that the multiple metal sheets (112) are provided pre-coated, in particular on both sides.
7. Method according to any of embodiments 1 to 6, characterized in that the one or more metal sheets (112) are each coated on both sides with the bonding substance (110).
8. Method according to any of embodiments 1 to 7, characterized in that a ratio between a thickness of the one or more metal sheets (112) and a layer thickness of the bonding substance (110) is in a range of from approximately 20:1 to approximately 250:1, in particular from approximately 25:1 to approximately 210:1.
9. Method according to any of embodiments 1 to 8, characterized in that the first activation (122) is a thermal activation in which the bonding substance (110) is heated to a first temperature (124), the first temperature (124) during the first activation (122) being in a range of from approximately 50° C. to approximately 90° C., in particular from approximately 60° C. to approximately 80° C., and the bonding substance (110) during the first activation (122) being heated in particular by means of a heating device (126), in particular by means of an infrared heating device (128).
10. Method according to any of embodiments 1 to 9, characterized in that the second activation (150) of the bonding substance (110) is carried out during and/or after the cutting up of the sheet-metal laminate (132) to produce the multiple sheet-metal laminate units (140) and/or the separation of the multiple sheet-metal laminate units (140) from the sheet-metal laminate (132).
11. Method according to any of embodiments 1 to 10, characterized in that the cutting up of the sheet-metal laminate (132) to produce the multiple sheet-metal laminate units (140) and/or the separation of the multiple sheet-metal laminate units (140) from the sheet-metal laminate (132) takes place by punching (148).
12. Method according to any of embodiments 1 to 11, characterized in that multiple sheet-metal laminate units (140) and/or multiple stacks (100) of metal sheets are joined, in particular clinched, by forming.
13. Method according to any of embodiments 1 to 12, characterized in that the second activation (150) of the bonding substance (110) is a thermal activation in which the bonding substance (110) is heated to a second temperature (152), the second temperature (152) being approximately 120° C. or more, in particular approximately 130° C. or more.
14. Method according to any of embodiments 1 to 13, characterized in that, in particular after a stacking (158) multiple stacks (100) of metal sheets, the stack (100) of metal sheets is marked, the marking being carried out in particular by means of a data matrix code and/or by means of laser inscription. 15. Method according to any of embodiments 1 to 14, characterized in that the bonding substance (110) comprises a resin material and an elastomer material.
16. Method according to any of embodiments 1 to 15, characterized in that a proportion of the elastomer material is in a range of from approximately 1 vol. % to approximately 25 vol. %, in particular from approximately 5 vol. % to approximately 20 vol. %, based on a total volume of the bonding substance (110) or based on a total volume of a bonding substance/solvent mixture.
17. Method according to any of embodiments 1 to 16, characterized in that the elastomer material comprises or is formed from a synthetic rubber material, in particular an acrylonitrile butadiene rubber.
18. Method according to any of embodiments 1 to 17, characterized in that a Shore hardness A of the bonding substance (110) and/or a Shore hardness A of a bonding substance/solvent mixture is in a range of from approximately 20 to approximately 90, in particular from approximately 30 to approximately 80.
19. Method according to any of embodiments 1 to 18, characterized in that the bonding substance (110) is electrically insulating, in particular after the first activation (122) and/or the second activation (150).
20. Method according to any of embodiments 1 to 19, characterized in that the resin material comprises or is formed from an epoxy resin material and/or a thermosetting polymer material, in particular a phenolic resin polymer material, in particular a novolak.
21. Method according to any of embodiments 1 to 20, characterized in that a proportion of the resin material in the bonding substance (110) is in a range of from approximately 1 vol. % to approximately 15 vol. %, in particular from approximately 2 vol. % to approximately 10 vol. %, based on a total volume of the bonding substance (110) or on a total volume of a bonding substance/solvent mixture.
22. Method according to any of embodiments 1 to 21, characterized in that the bonding substance (110) is mixed with a solvent (118) before the coating of the one or more metal sheets (112), with a proportion of the solvent (118) being in a range of from approximately 65 vol. % to approximately 95 vol. %, in particular from approximately 70 vol. % to approximately 90 vol. %, based on a total volume of a resulting bonding substance/solvent mixture.
23. Method according to any of embodiments 1 to 22, characterized in that the bonding substance (110) is mixed with a solvent (118) before the coating of the one or more metal sheets (112), the solvent (118) comprising or being formed from one or more medium-volatile to highly volatile solvents.
24. Method according to any of embodiments 1 to 23, characterized in that the bonding substance (110) is mixed with a solvent (118) before the coating of the one or more metal sheets (112), the solvent (118) comprising or being formed from in particular a mixture of methoxypropyl acetate and butyl acetate.
25. Method according to any of embodiments 1 to 24, characterized in that the bonding substance (110) comprises an adhesion promoter, the adhesion promoter comprising or being formed from in particular an organically functionalized silane, in particular an aminosilane.
26. Method according to any of embodiments 1 to 25, characterized in that the bonding substance (110) comprises an adhesion promoter, with a proportion of the adhesion promoter being in a range of from approximately 0.5 vol. % to approximately 6 vol. %, in particular from approximately 1 vol. % to approximately 5 vol. %, based on a total volume of the bonding substance (110) or based on a total volume of a bonding substance/solvent mixture.
27. Method according to any of embodiments 1 to 26, characterized in that a modulus of elasticity of the bonding substance (110) and/or a modulus of elasticity of a bonding substance/solvent mixture is in a range from approximately 100 N/mm$^2$ to approximately 1000 N/mm$^2$, in particular from approximately 300 N/mm$^2$ to approximately 800 N/mm$^2$.
28. Method according to any of embodiments 1 to 27, characterized in that the bonding substance (110), in particular as a bonding substance/solvent mixture, is applied to the one or more metal sheets (112) by means of one or more of the following coating methods: spraying, brushing, pouring.
29. Stack (100) of metal sheets, in particular a rotor core (106) and/or a stator core (108), comprising multiple sheet-metal laminate units (140), wherein one or more sheet-metal laminate units (140) comprise exactly three metal sheets (112), each of which is coated on both sides with a bonding substance (110), the stack (100) of metal sheets being produced in particular using a method according to any of embodiments 1 to 28.
30. Stack (100) of metal sheets according to embodiment 29, characterized in that a thickness of each metal sheet (112) perpendicularly to its main extension plane is at most approximately 0.3 mm, in particular at most approximately 0.25 mm, in particular at most approximately 0.2 mm.
31. Stack (100) of metal sheets according to embodiment 29 or 30, characterized in that the metal sheets (112) of the sheet-metal laminate units (140) are flat and/or free of projections and/or recesses, in particular in parallel with and/or perpendicularly to a main extension plane of at least one metal sheet (112).
32. Stack (100) of metal sheets according to any of embodiments 29 to 31, characterized in that the stack (100) of metal sheets is fluid-tight, in particular in directions extending transversely to the main extension planes of the metal sheets (112).
33. Machine component, in particular a rotor (101) and/or a stator (103), comprising one or more stacks (100) of metal sheets, produced using a method according to any of embodiments 1 to 28 and/or comprising one or more stacks (100) of metal sheets according to any of embodiments 29 to 32.
34. Electric motor (105) comprising a housing, a rotor (101) and a stator (103), wherein the rotor (101) and/or the stator (103) are machine components according to embodiment 33.
35. Electric motor (105) according to embodiment 34, characterized in that the electric motor (105) has a cooling device (164) which comprises a cooling medium guide which extends on a side of the stator (103) facing away from the rotor (101) and/or is delimited by the stator (103).

36. Electric motor (105) according to embodiment 34 or 35, characterized in that the electric motor (105) comprises a cooling device (164) which comprises a cooling medium guide element (166) which extends in particular directly along the rotor (101) on a side of the rotor (101) facing away from the stator (103).

The invention claimed is:

1. Method for producing a stack of metal sheets, wherein the method comprises the following:
 coating one or more metal sheets with a bonding substance;
 bonding multiple metal sheets to form a sheet-metal laminate by a first activation of the bonding substance;
 cutting up the sheet-metal laminate to produce multiple sheet-metal laminate units and/or cutting out multiple sheet-metal laminate units from the sheet-metal laminate; and
 bonding the multiple sheet-metal laminate units to form a stack of metal sheets by a second activation of the bonding substance,
wherein the bonding substance comprises a resin material and an elastomer material.

2. Method according to claim 1, wherein a proportion of the elastomer material is in a range of from approximately 1 vol. % to approximately 25 vol. % based on a total volume of the bonding substance or based on a total volume of a bonding substance/solvent mixture.

3. Method according to claim 1, wherein the elastomer material comprises or is formed from a synthetic rubber material.

4. Method according to claim 1, wherein a Shore hardness A of the bonding substance and/or a Shore hardness A of a bonding substance/solvent mixture is in a range of from approximately 20 to approximately 90.

5. Method according to claim 1, wherein the bonding substance is electrically insulating.

6. Method according to claim 1, wherein the resin material comprises or is formed from an epoxy resin material and/or a thermosetting polymer material.

7. Method according to claim 1, wherein a proportion of the resin material in the bonding substance is in a range of from approximately 1 vol. % to approximately 15 vol. % based on a total volume of the bonding substance or on a total volume of a bonding substance/solvent mixture.

8. Method according to claim 1, wherein the bonding substance is mixed with a solvent before the coating of the one or more metal sheets, with a proportion of the solvent being in a range of from approximately 65 vol. % to approximately 95 vol. % based on a total volume of a resulting bonding substance/solvent mixture.

9. Method according to claim 1, wherein the bonding substance is mixed with a solvent before the coating of the one or more metal sheets, the solvent comprising or being formed from one or more medium-volatile to highly volatile solvents.

10. Method according to claim 1, wherein the bonding substance is mixed with a solvent before the coating of the one or more metal sheets.

11. Method according to claim 1, wherein the bonding substance comprises an adhesion promoter.

12. Method according to claim 1, wherein the bonding substance comprises an adhesion promoter, with a proportion of the adhesion promoter being in a range of from approximately 0.5 vol. % to approximately 6 vol. %.

13. Method according to claim 1, wherein a modulus of elasticity of the bonding substance and/or a modulus of elasticity of a bonding substance/solvent mixture is in a range from approximately 100 $N/mm^2$ to approximately 1000 $N/mm^2$.

14. Method according to claim 1, wherein the bonding substance is applied to the one or more metal sheets by means of one or more of the following coating methods: spraying, brushing, pouring.

* * * * *